US012658722B2

(12) United States Patent
Coons et al.

(10) Patent No.: US 12,658,722 B2
(45) Date of Patent: Jun. 16, 2026

(54) CHARGING STATION FOR BATTERY-POWERED DEVICES INCLUDING TWO-WAY RADIOS AND POWER TOOLS

(71) Applicant: Advanced Wireless Communications, Lakeville, MN (US)

(72) Inventors: Kenneth James Coons, Lakeville, MN (US); Bernard Frederick Brondum, III, Saint Paul, MN (US)

(73) Assignee: Advanced Wireless Communications, Lakeville, MN (US)

( * ) Notice: Subject to any disclaimer, the term of this patent is extended or adjusted under 35 U.S.C. 154(b) by 1033 days.

(21) Appl. No.: 17/824,567

(22) Filed: May 25, 2022

(65) Prior Publication Data
US 2022/0385082 A1      Dec. 1, 2022

Related U.S. Application Data

(60) Provisional application No. 63/193,216, filed on May 26, 2021.

(51) Int. Cl.
| | |
|---|---|
| *H02J 7/70* | (2026.01) |
| *H02J 7/40* | (2026.01) |
| *H02J 7/50* | (2026.01) |
| *H02J 7/82* | (2026.01) |

(52) U.S. Cl.
CPC ............... *H02J 7/731* (2026.01); *H02J 7/40* (2026.01); *H02J 7/50* (2026.01); *H02J 7/82* (2026.01)

(58) Field of Classification Search
CPC ..................................................... H02J 7/0044
USPC ........................................................ 320/107
See application file for complete search history.

(56) References Cited

U.S. PATENT DOCUMENTS

| | | | | | |
|---|---|---|---|---|---|
| 10,797,496 | B2 * | 10/2020 | Grifoni | ................. | H02J 7/0045 |
| 2007/0002533 | A1 * | 1/2007 | Kogan | ................... | G06F 1/1632 |
| | | | | | 361/679.41 |
| 2010/0102777 | A1 * | 4/2010 | Sa | ........................... | G06F 1/1632 |
| | | | | | 320/115 |
| 2013/0113420 | A1 | 5/2013 | Majoris, Jr. | | |
| 2019/0341791 | A1 * | 11/2019 | Grifoni | ................. | H02J 7/0013 |

* cited by examiner

*Primary Examiner* — Yalkew Fantu
(74) *Attorney, Agent, or Firm* — Schweman Lundberg & Woessner, P.A.

(57)          ABSTRACT
A charging station can simultaneously charge various types of battery-powered devices including two-way radios and power tools. The charging station includes multiple charging cups positioned on a charging base and can be made customizable by providing a variety of replaceable charging cups from which the multiple charging cups can be chosen. The replaceable charging cups can each be configured to allow one or more of the battery-powered devices to be inserted for charging.

20 Claims, 8 Drawing Sheets

CHARGING STATION 200

| 102-1 | 102-2 | | 102-N |
|---|---|---|---|
| REPLACEABLE CHARGING CUP 1 | REPLACEABLE CHARGING CUP 2 | ... | REPLACEABLE CHARGING CUP N |

| 104-1 | 104-2 | | 104-N |
|---|---|---|---|
| CHARGING CUP RECEPTACLE 1 | CHARGING CUP RECEPTACLE 2 | ... | CHARGING CUP RECEPTACLE N |

TO POWER SUPPLY

106
CHARGING CIRCUIT

208
MONITORING CIRCUIT

210
CHARGING BASE

COMMUNICATION HUB DEVICE

224
CHARGING PROCESSOR

222

502-A

502-B

502-C

502-D

300

830

831

PROVIDING A CHARGING BASE

832

PROVIDING A PLURALITY OF
REPLACEABLE CHARGING CUPS

833

SELECTING CHARGING CUPS FROM THE
PLURALITY OF REPLACEABLE CHARGING CUPS

834

INSERTING THE SELECTED CHARGING
CUPS INTO THE CHARGING BASE

CHARGING STATION FOR BATTERY-POWERED DEVICES INCLUDING TWO-WAY RADIOS AND POWER TOOLS

CLAIM OF PRIORITY

This application claims the benefit of priority under 35 U.S.C. § 119(e) of U.S. Provisional Patent Application Ser. No. 63/193,216, filed on May 26, 2021, which is herein incorporated by reference in its entirety.

TECHNICAL FIELD

This document relates generally to battery charging devices and more particularly to a charging station for charging different types of battery-powered devices including two-way radios and power tools.

BACKGROUND

Battery-powered devices have been increasingly popular with the advances in rechargeable battery technology. Laptop and tablet computers, cellphones, two-way radios, and power tools are just a few examples of battery-powered devices that need frequent recharging when being used. The substantially different mechanical and electrical characteristics of such devices and their batteries necessitate different charging accommodations. Managing charging needs may become a burden for a user who needs to use different chargers for various devices, especially when traveling and/or working on a remote site.

SUMMARY

A charging station can simultaneously charge various types of battery-powered devices. The charging station includes multiple charging cups positioned on a charging base and can be made customizable by providing a variety of replaceable charging cups from which the multiple charging cups can be chosen. The replaceable charging cups can each be configured to allow one or more of the battery-powered devices to be inserted for charging.

In one example, a charging station for charging battery-powered devices may include a charging base and charging cups. The charging base may be configured to mechanically and electrically connect to the charging cups and to provide electrical energy to each charging cup of the charge cups. The charging cups include at least one radio charging cup configured to receive at least one two-way radio and at least one tool charging cup configured to receive at least one power tool. The charging base may be configured to recognize a type of charging to be performed through each charging cup and to charge each two-way radio and each power tool received by the charging cups.

In one example, a system for charging battery-powered devices may include a charging base and a plurality of replaceable charging cups. The charging base may be configured to mechanically and electrically connect to two or more replaceable charging cups that are selected from the plurality of replaceable charging cups and are each configured to receive one or more battery-powered devices. The charging base may include base charging circuitry and a monitoring circuit. The base charging circuitry may be configured to provide electrical energy to each connected replaceable charging cup for charging each device received by that cup. The monitoring circuit may be configured to monitor a charging status for each device being charged. The plurality of replaceable charging cups include at least one radio charging cup configured to receive at least one two-way radio and at least one tool charging cup configured to receive at least one power tool.

In one example, a method for charging battery-powered devices is provided. The method may include: providing a charging base configured to mechanically and electrically connect to charging cups each configured to receive one or more devices of the battery-powered devices and to charge each device received by the connected charging cups; selecting the charging cups from a plurality of replaceable charging cups including at least one radio charging cup configured to receive at least one two-way radio and at least one tool charging cup configured to receive at least one power tool; and inserting each of the selected charging cups into a charging cup receptacle of the charging base to be mechanically and electrically connected to the charging base.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
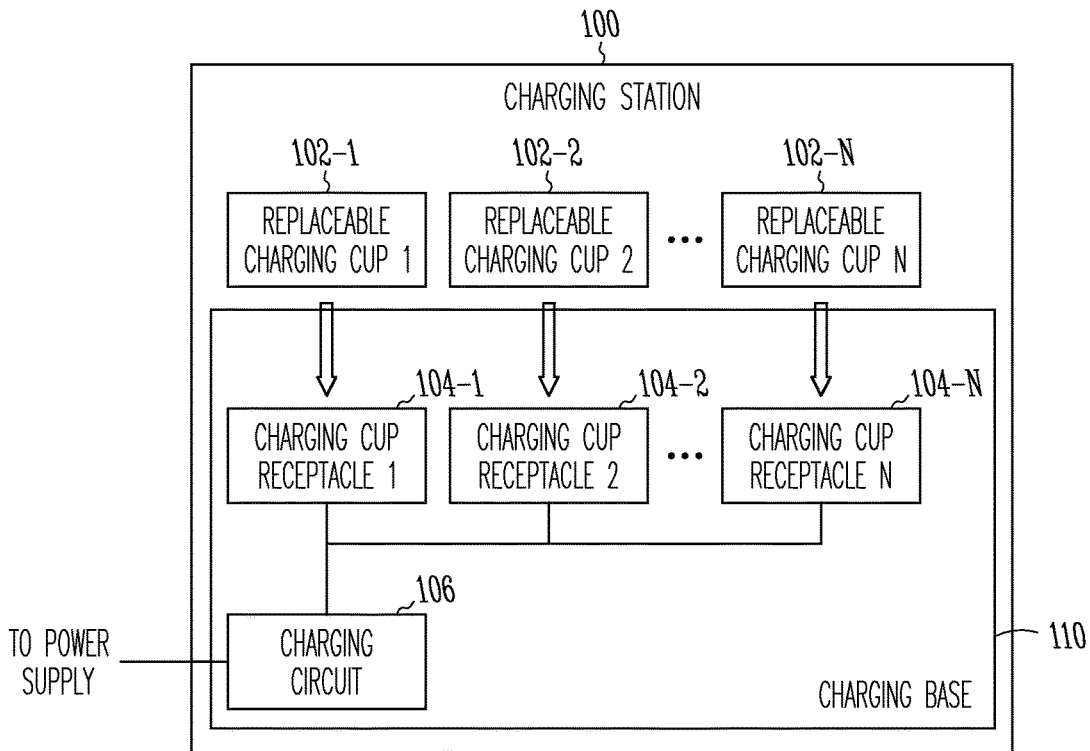
FIG. 1 is a block diagram illustrating a user-customizable multi-unit charging station, according to an embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses, among other things, a multi-unit modular charger that is capable of simultaneously charging multiple different or similar devices. The charger can also be used as an organized storage location for the devices.

It has been increasingly common for a user to charge a number of substantially different devices on a frequent and/or regular basis using multiple chargers. While "universal" chargers have been introduced, each of them may be limited to a few types of devices, such as the same type of devices of the same brand. Consequently, organization and use of various devices and their chargers can be a burden to the user. In one example, a user that uses one or more two-way radios and one or more power tools of various brands may need chargers for each type (two-way radio or power tool) and/or each brand. The user may also use one or more mobile devices such as one or more smartphones and/or one or more tablet computers of various brands and need chargers for each mobile device.

The multi-unit modular charger according to the present subject matter can be customized by the user according to the devices that need to be charged. Various replaceable charging cups are provided to accommodate various types and brands of devices, and the user can select the same or different cups for each charger according to his/her needs. In various embodiments, the present subject matter provides a charging station that can be customized for charging various devices, including at least a two-way radio and a power tool, simultaneously.

Two-way radios can transmit and receive radio signals by operating in a half-duplex mode (allowing for transmission or receiving in turn but not both simultaneously) or a full-duplex mode (allowing for both transmission and receiving simultaneously). In various embodiments, a two-way radio according to the present subject matter can operate in one or more very-high-frequency (VHF) bands (i.e., one or more frequency bands within the VHF range), one or more ultra-high-frequency (UHF) bands (i.e., one or more frequency bands within the UHF range), and/or one or more other suitable frequency bands to transmit and receive radio signals. In various embodiments, a two-way radio according to the present subject matter transmits and receives radio signals using frequencies that are not within the frequency ranges assigned for cellular communications in the region where the two-way radio is used.

Examples of frequency bands at which the two-way radio according to the present subject matter (e.g., the two-way radio 212 as discussed below) can operate include (but are not limited to):

150 MHz-160 MHz (within VHF range) and 450 MHz-470 MHz (within UHF range), for use in the United State of America and Canada;

The Private Mobile Radio, 446 MHz (or PMR466) Band (446.00625 MHz-446.19375 MHz), for use in various European countries including most countries of the European Union;

The 33-centimeter (or 900 MHz) Band (902 MHz-928 MHz), for use in International Telecommunication Union (ITU) Region 2 (the Americas, Greenland, and some of the eastern Pacific Islands);

The Business Band, including Low-band frequencies (27.430 MHz-49.580 MHz), VHF frequencies (151.505 MHz-158.4075 MHz) and UHF frequencies (462.575 MHz-469.550 MHz), for use in the United States of America; and Unlicensed Bands, e.g., 902 MHz-928 MHz in the United States of America and 863 MHz to 870 MHz in Europe.

It is understood that past and present standards can be used. It is also contemplated that future versions of these standards and new future standards may be employed without departing from the scope of the present subject matter.

Power tools are tools that are actuated by a power source other than manual labor or by a combination of manual labor and a power source other than manual labor. A power tool according to the present subject matter is a battery-powered power tool (as referred to as a cordless power tool or cordless tool) that includes one or more rechargeable batteries as the power source. Examples of battery-powered power tools include electric drill, hammer drill, rotary hammer, nail gun, impact wrench, electric screw driver, impact driver, reciprocating saw, circuit saw, jigsaw, miter saw, chainsaw, beam saw, detail sander, belt sander, disc sander, random sander, random orbital sander, random orbital polisher, rotary tool, biscuit joiner, angle grinder, wood router, and shop vac.

In various embodiments, the power source is affixed (e.g., built into) the power tool and remains inside or attached to the power tool when being connected to a charger. In various embodiment, the power source is to be removed (e.g., detached) from the power tool to be connected to a charger. Thus, charging a power tool according to the present subject matter can include charging the power source of the power tool when the power source is affixed to the power tool or charging the power source of the power tool when the power source is removed from the power tool, depending on the design of the power tool.

FIG. 1 is a block diagram illustrating a multi-unit charging station 100, according to an embodiment of the present subject matter. Charging station 100 is customizable by a user for charging battery-powered devices and/or batteries, including two-way radios and power tools, using charging accessories including a variety replaceable charging cups each configured for charging one or more devices of specified model(s) and brand(s). Charging station 100 includes replaceable charging cups 102 and a charging base 110.

Replaceable charging cups 102 include up to N cups 102-1, 102-2, . . . , 102-N, with N being an integer 2 or greater. Replaceable charging cups 102 are each selected from the charging accessories to allow one or more devices of the battery-powered devices to be inserted for charging. In one embodiment, replaceable charging cups 102 include one or more replaceable charging cups each configured to charge at least one two-way radio of the two-way radios and one or more replaceable charging cups each configured to charge at least one power tool of the power tools. In various embodiments, replaceable charging cups 102 further include one or more replaceable charging cups each configured to charge a mobile device such as a cellphone, a smartphone, a tablet computer, or any other type of battery-powered mobile device. In various embodiments, replaceable charging cups 102 further include one or more replaceable charging cups each configured to charge one or more batteries of one or more battery-powered devices.

Charging base 110 can accommodate replaceable charging cups 102 and include charging cup receptacles 104 and a charging circuit 106. Charging cup receptacles 104 include N receptacles 104-1, 104-2, . . . , 104-N and can each accommodate a charging cup of charging cups 102. Depending on specific needs, the user can choose to place 1 to N charging cups 102 in charging cup receptacles 104. Charging circuit 106 provides one or more forms of electrical energy each suitable for charging one or more types the battery-powered devices. In various embodiments, the form(s) of electrical energy delivered to each device being charged is selected by the configuration of the replaceable charging cup for that device. In various embodiments, charging circuit 106 can receive a form of input electrical energy from a power supply and convert the received input electrical energy into the one or more forms of output electrical energy each suitable for charging one or more types of the battery-powered devices. One example of the input electrical energy includes an AC electrical current having a voltage between 110 V and 240 V, such as received directly from a wall power outlet. Another example of the input electrical energy includes a high-amperage DC electrical current having a voltage of 12 V, 24 V, or any other suitable voltage, such as received from an AC adapter connected to a wall power outlet. The one or more forms of output electrical energy can include DC electrical signals each having a voltage of 3 V, 5 V, 9 V, 12 V, 24 V, or any voltage required for charging the battery-powered devices.

In one embodiment, charging circuit 106 is positioned in charging base 100, with replaceable charging cups 102 and charging cup receptacles 104 providing electrical connections between charging circuit 106 and the devices being inserted into replaceable charging cups 102 for charging. In another embodiment, as further discussed below with reference to FIG. 7, charging circuit 106 includes circuitry distributed in charging base 110 and replaceable charging cups 102. In various embodiments, charging circuit 106 can include circuitry distributed in charging base 110, replaceable charging cups 102, and charging cup receptacles 104 in any suitable manner as determined by one skilled in the art.

Figure 2:
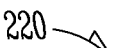
FIG. 2 is a block diagram illustrating a charging system including a user-customizable multi-unit charging station and a communication hub device, according to an embodiment of the present subject matter.

FIG. 2 is a block diagram illustrating a charging system 220 including a multi-unit charging station 200 and a communication hub device 222, according to an embodiment of the present subject matter. Charging station 200 includes replaceable charging cups 102 and a charging base 210. Charging base 210 includes charging cup receptacles 104, charging circuit 106, and a monitoring circuit 208. Thus, charging station 200 includes the components of charging station 100 plus monitoring circuit 208. Monitoring circuit 208 can monitor the charging status for each device being charged, produce a status signal indicative of the charging status, and transmit the status signal to communication hub device 222. Communication hub device 222 can be communicatively coupled to charging station 200 via a wired or wireless connection to receive the status signal and can transmit one or more signals indicative of the charging status of each device to one or more users. Communication hub device 222 can include a charging processor 224 that is configured to process the status signal and produce the one or more signals indicative of the charging status of each device to be presented to the one or more users. In various embodiments, communication hub device 222 can be communicatively coupled to a computer, a cellphone, a two-way radio, a pager, and/or any device suitable for delivering the charging status to a user. In various embodiments, communication hub device 222 can be implemented on a modular wireless communication platform that is customizable and/or expandable by installing application-specific software and/or hardware modules.

In various embodiments, circuits of charging station 110 and charging system 220, including its various embodiments discussed herein, may be implemented using a combination of hardware and software. For example, charging circuit 106, monitoring circuit 208, and circuits of communication device 222 may each be implemented using an application-specific circuit constructed to perform one or more particular functions or a general-purpose circuit programmed to perform such function(s). Such a general-purpose circuit includes, but is not limited to, a microprocessor or a portion thereof, a microcontroller or portions thereof, and a programmable logic circuit or a portion thereof.

It is understood that charging station 110, charging station 210, and communication hub device 222 may each include a processor. The processor in communication hub device 222 may be configured to include charging processor 224. The processor may be a digital signal processor (DSP), microprocessor, microcontroller, field programmable gate array (FPGA), other digital logic, application specific integrated circuit (ASIC), or combinations thereof. Processing of signals (including but not limited to the status signal indicative of the charging status) may be performed by a single processor or multiple devices, and done in the digital domain, the analog domain, or combinations thereof. For brevity, drawings may omit certain blocks that perform frequency synthesis, frequency analysis, analog-to-digital conversion, digital-to-analog conversion, amplification, buffering, and certain types of filtering and processing. In various embodiments, the processor is adapted to perform instructions stored in one or more memories, which may not be explicitly shown in the drawings. Various types of memory may be used, including volatile and nonvolatile forms of memory, such as register, cache memory, read-only memory (ROM), random access memory (RAM), programmable read-only memory (PROM), and erasable programmable read-only memory (EPROM). In various embodiments, different realizations of the block diagrams, circuits, and processes set forth herein can be created by one of skill in the art without departing from the scope of the present subject matter.

Figures 3, 4:
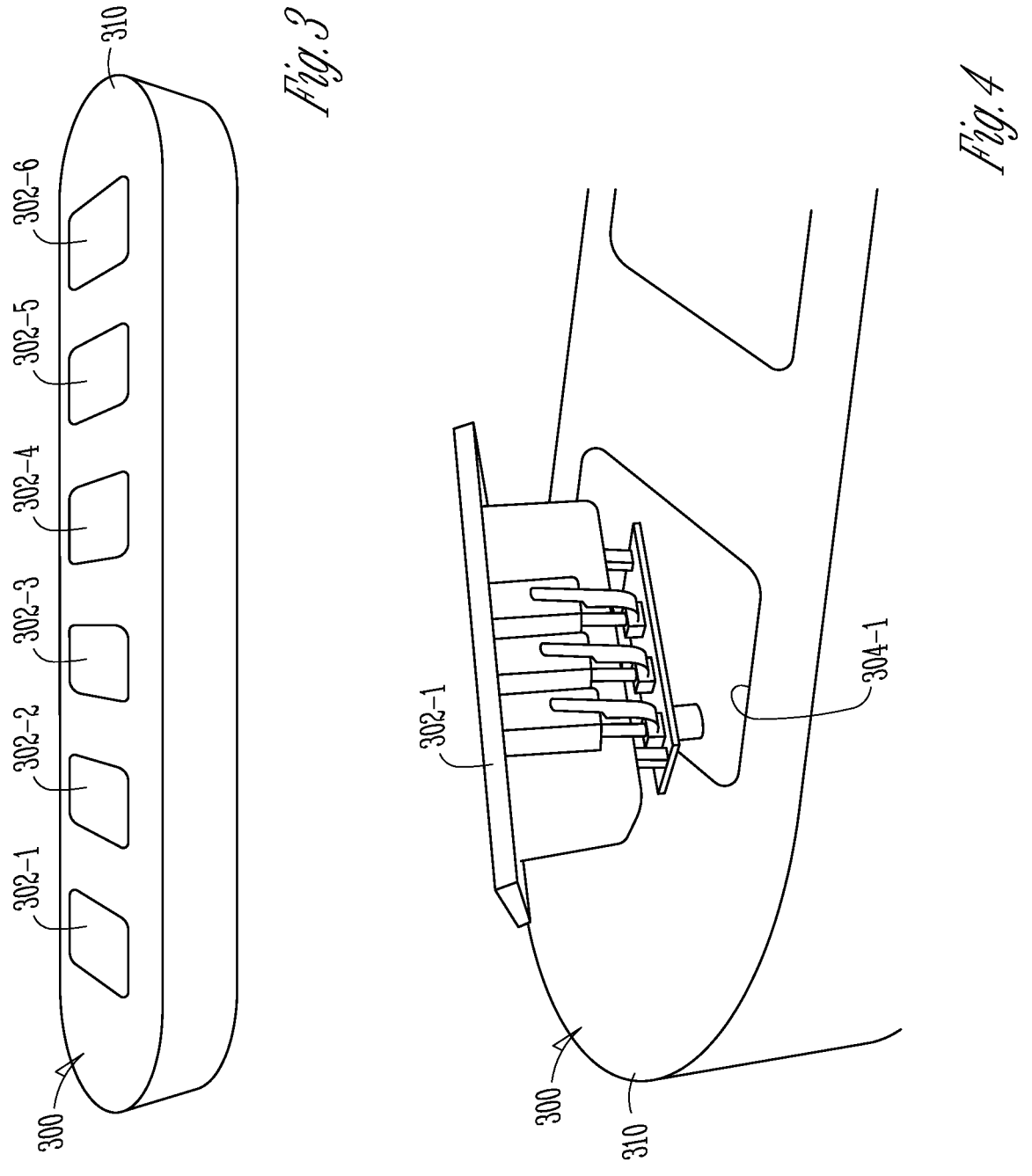
FIG. 3 is an illustration of a user-customizable multi-unit charging station, according to an embodiment of the present subject matter.
FIG. 4 is an illustration of a portion of the charging station of FIG. 3 showing a replaceable charging cup and a charging cup receptacle in the charging base of the charging station, according to an embodiment of the present subject matter.

FIG. 3 is an illustration of a user-customizable multi-unit charging station 300, according to an embodiment of the present subject matter. Charging station 300 represents an example of charging station 100 or 200 and includes six replaceable charging cups 302 and a charging base 310. Replaceable charging cups 302-1, 302-2, 302-3, 302-4, 302-5, and 302-6 each represent an example of replaceable charging cup 102. Charging base 310 represents an example of charging base 110 or 210. While charging station 300 includes six replaceable charging cups to charge six or more battery-powered devices and/or batteries simultaneously as an example, a charging station according to the present subject matter can include two or more replaceable charging cups to charge two or more battery-powered devices and/or batteries simultaneously.

FIG. 4 is an illustration of a portion of charging station 300 showing replaceable charging cup 302-1 and a charging cup receptacle 304-1 in charging base 310, according to an embodiment of the present subject matter. Charging cup 302-1 is shown in FIG. 4 as being detached from charging cup receptacle 304-1.

FIGS. 5A-D are each an illustration of a replaceable charging cup 502 for use with charging station of 300, according to various embodiments of the present subject matter. Charging cups 502 as illustrated in FIGS. 5A-D are

Figure 5A:
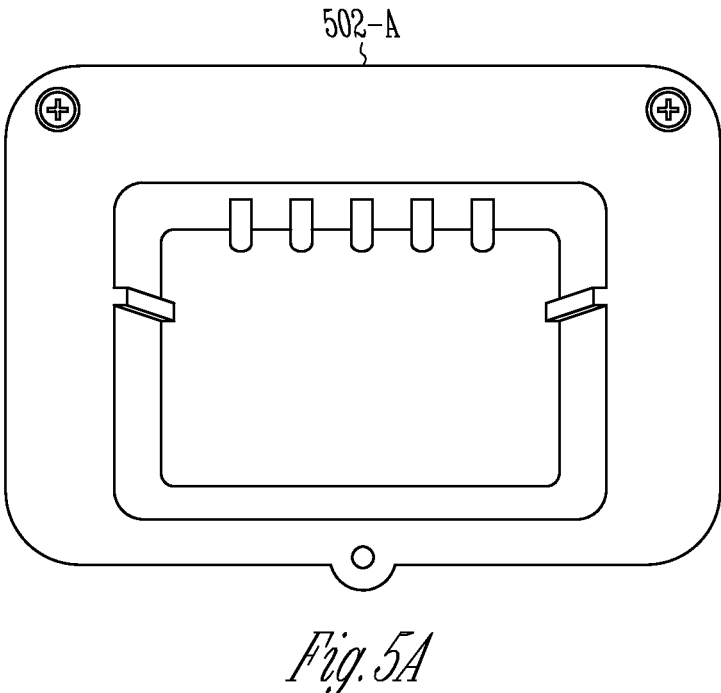
FIGS. 5A-5D are each an illustration of a replaceable charging cup for use with the user-customizable multi-unit charging station of FIG. 3, with FIG. 5A showing a charging cup for charging a single device, FIG. 5B showing a charging cup for charging a device and a battery, FIG. 5C showing a charging cup for charging two devices, and FIG. 5D showing a charging cup for charging four batteries, according to various embodiments of the present subject matter.
Figure 5B:
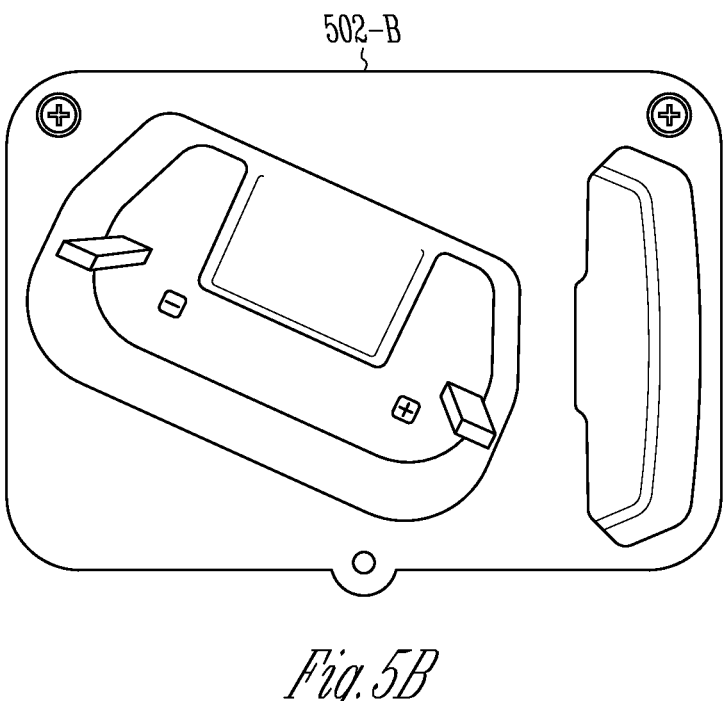
Figure 5C:
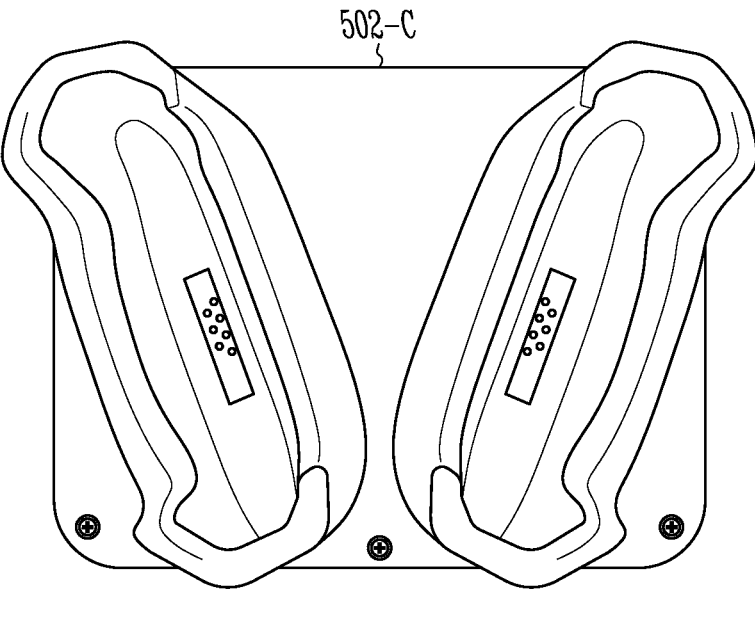
Figure 5D:
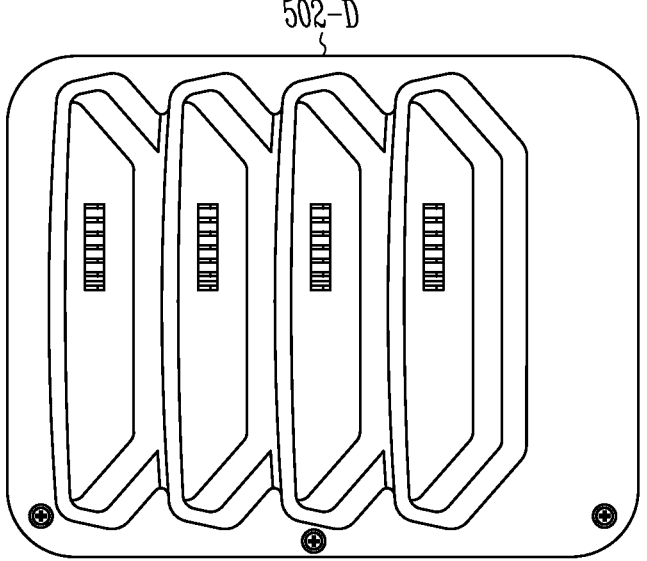

7 each a non-limiting example of charging cups 102. FIG. 5A shows a charging cup 502-A for charging a single battery-powered device. FIG. 5B shows a charging cup 502-B for charging a battery-powered device and a battery. FIG. 5C shows a charging cup 502-C for charging two battery-powered devices. FIG. 5D shows a charging cup 504-D for charging four batteries.

Figure 6:
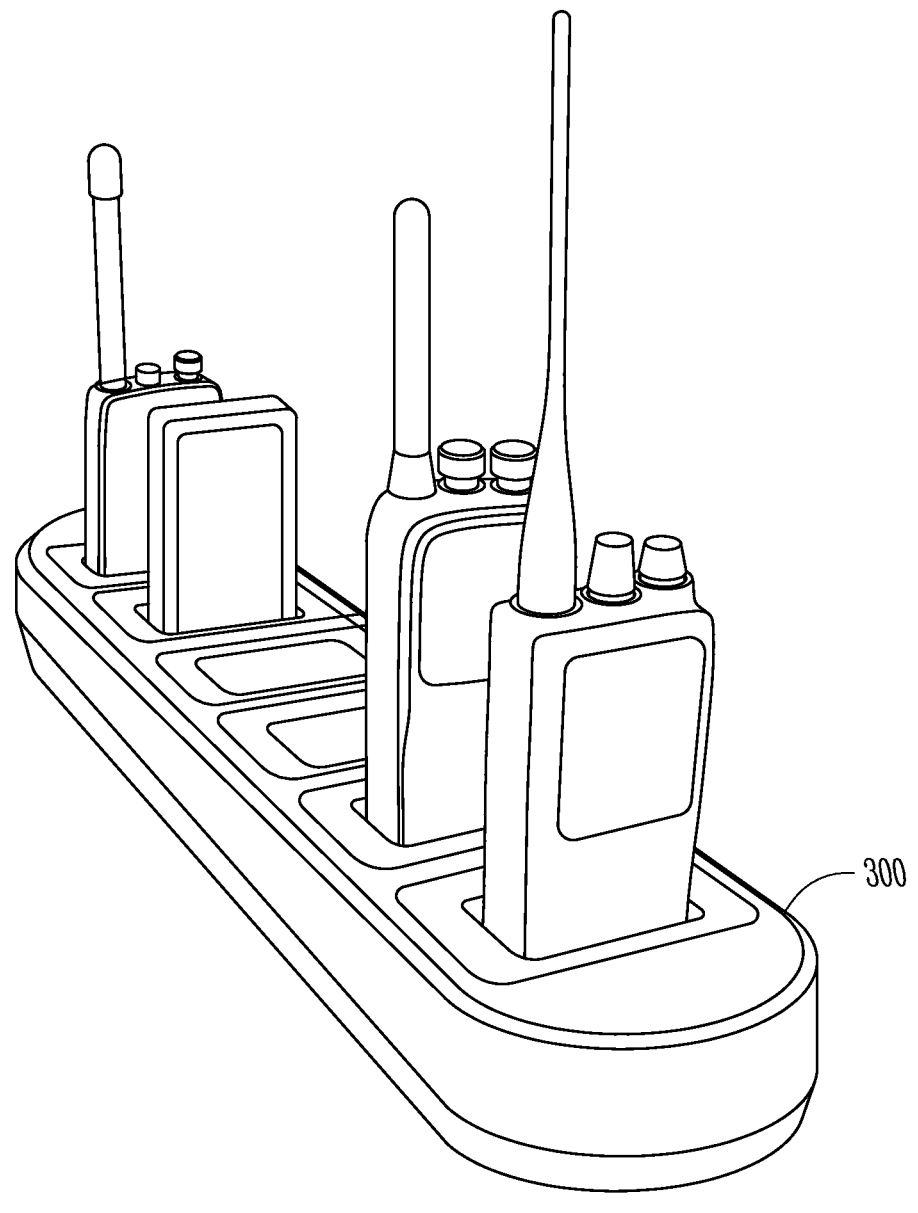
FIG. 6 is an illustration of the user-customizable multi-unit charging station of FIG. 3 with several devices inserted for being charged, according to an embodiment of the present subject matter.

FIG. 6 is an illustration of charging station 300 with several devices inserted for being charged, according to an embodiment of the present subject matter. In various embodiments, a variety of replaceable charging cups are provided. The replaceable charging cups are each configured to allow one or more battery-powered devices and/or batteries to be inserted for charging. The replaceable charging cups include one or more charging cups each configured to charge at least one two-way radio and one or more charging cups each configured to charge at least one power tool. A charging base of a charging station is also provided. The charging base includes a plurality of charging cup receptacles each configured to accommodate a charging cup of the provided replaceable charging cups. The charging station is customizable by a user by selecting a plurality of charging cups from the provided replaceable charging cups to be placed in the plurality of charging cup receptacles.

Figure 7:
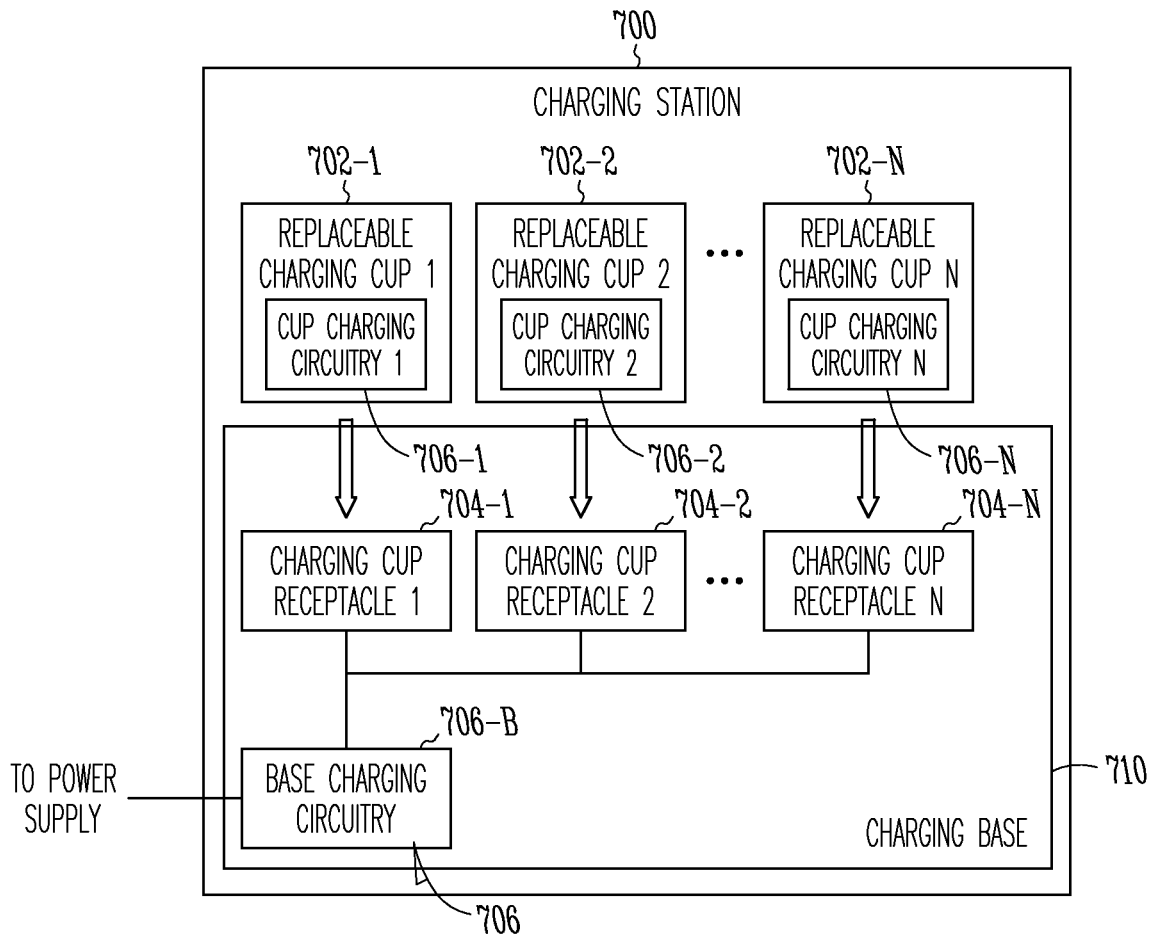
FIG. 7 is a block diagram illustrating the user-customizable multi-unit charging station of FIG. 1 showing an exemplary distribution of a charging circuit, according to an embodiment of the present subject matter.

FIG. 7 is a block diagram illustrating a charging station 700. Charging station 700 represents an example of charging station 100 with its charging circuit 106 distributed in both the charging base and the replaceable charging cups. Charging station 700 includes replaceable charging cups 702 and a charging base 110.

Replaceable charging cups 702 represent an example of replaceable charging cups 102 and include up to N cups 702-1, 702-2, . . . , 702-N, with N being an integer 2 or greater. Charging base 710 represents an example of charging base 110 and can accommodate replaceable charging cups 702 and include charging cup receptacles 704. Charging cup receptacles 704 represent an example of charging cup receptacles 104 and include N receptacles 704-1, 704-2, . . . , 704-N and can each accommodate a charging cup of charging cups 702. A charging circuit 706, which represents an example of charging circuit 106, is distributed in charging base 710 and replaceable charging cups 702. Charging base 710 includes base charging circuitry 706-B of charging circuit 706. Replaceable charging cups 702-1, 702-2, . . . , 702-N includes respective cup charging circuitry 706-1, 706-2, . . . , 706-N. Charging cup receptacles 704 provides for electrical connections between base charging circuitry 706-B and each of cup charging circuitry 706-1, 706-2, . . . , 706-N. Charging station 700 can include all the characteristics and functionalities of charging station 100 as discussed above while having charging circuitry distributed in both charging base 710 and replaceable charging cups 702. For example, charging circuitry 706-B can include portions of charging circuit 706 that are "universal" to all the devices and/or batteries that can be charged using charging station 700, and cup charging circuitry 706-1, 706-2, . . . , 706-N can each include portions of charging circuit 706 that are customized for the one or more types of devices and/or batteries that can be charged using the respective replaceable charging cup.

Figure 8:
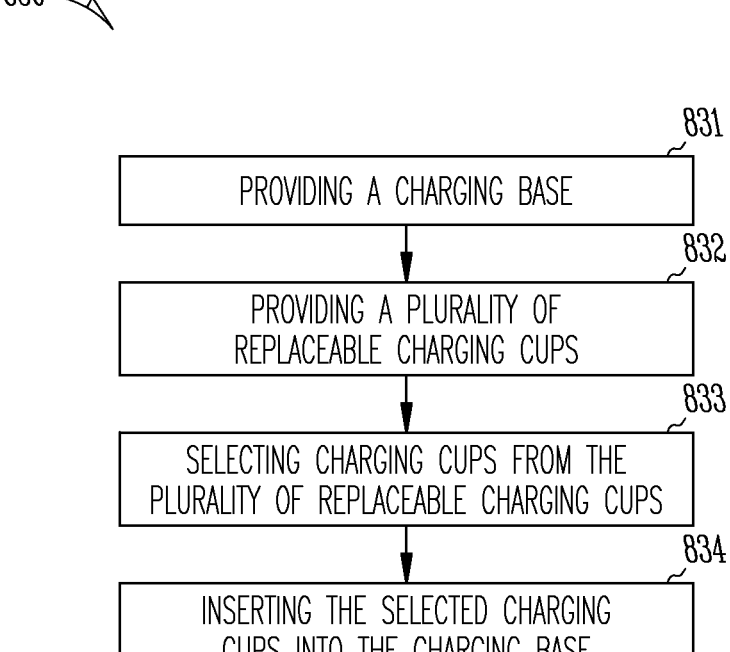
FIG. 8 is a flow chart illustrating a method for charging battery-powered devices, according to an embodiment of the present subject matter.

FIG. 8 is a flow chart illustrating a method 830 for charging battery-powered devices, according to an embodiment of the present subject matter. In various embodiments, charging battery-powered devices can include charging battery-powered devices without removing (including detaching) the battery or batteries from each battery-powered device and charging the battery or batteries removed from each battery-powered device. In various embodiments, method 830 is performed to provide a customized battery charging station capable of simultaneously charging multiple battery-powered devices of various types.

At 831, a charging base is provided. The charging base is configured to mechanically and electrically connect to charging cups.

At 832, a plurality of replaceable charging cups is provided. The plurality of replaceable charging cups includes at least one radio charging cup configured to receive at least one two-way radio and at least one tool charging cup configured to receive at least one power tool. The plurality of replaceable charging cups can further include one or more replaceable charging cups configured to receive smartphone(s) and/or tablet computer(s). In various embodiments, the replaceable charging cups can each be configured to receive one device, multiple devices of the same type, or multiple devices of two or more types for charging.

At 833, the charging cups to be mechanically and electrically connected to the charging base are selected from the plurality of replaceable charging cups.

At 834, each of the selected charging cups is inserted into a charging cup receptacle of the charging base. This results in a charging station customized according to the type of devices that need to be charged. Each device to be charged can then be inserted into a replaceable charging cup in the customized charging station for charging. The charging station can be re-customized by replacing an inserted replaceable charging cup with a different type of replaceable charging cup. This can be done by removing the inserted replaceable charging cup from the respective charging cup receptacle and inserting the different type of replaceable charging cup into that charging cup receptacle.

In one embodiment, the charging status for each device being charged by the charging base is monitored using a monitoring circuit in the charging base, and the user of the charging station is informed of the charging status. In one embodiment, the monitoring is provided using a communication hub device that is configured to be communicatively coupled to the charging station, for example via a wireless communication link. The monitoring circuit can be configured (e.g., programmed) to monitor the charging status, to produce a status signal indicative of the charging status, and to transmit the status signal to the communication hub device. The status signal can be processed using a processor of the communication device for informing the user of the charging status.

It is to be understood that the above detailed description is intended to be illustrative, and not restrictive. Other embodiments will be apparent to those of skill in the art upon reading and understanding the above description. The scope of the present subject matter should be determined with reference to the appended claims, along with the full scope of legal equivalents to which such claims are entitled.

What is claimed is:

1. A charging station for charging battery-powered devices including two-way radios and power tools, comprising:
   a charging base including:
      charging cup receptacles configured to receive charging cups, the charging base configured to provide electrical energy to each charging cup of the charge cups through a charging cup receptacle of the charging cup receptacles; and
      a monitoring circuit configured to monitor a charging status for each device being charged in one of the received charging cups; and the charging cups including:

at least one radio charging cup configured to receive at least one two-way radio of the two-way radios; and at least one tool charging cup configured to receive at least one power tool of the power tools, wherein the charging base is configured to recognize a type of charging to be performed through each charging cup and to charge each two-way radio and each power tool received by the charging cups, and the charging cup receptacles are each configured to accommodate any one of the charging cups.

2. The charging station of claim 1, wherein the charging cups are replaceable charging cups each configured to be detachably inserted into any one of the charging cup receptacles.

3. The charging station of claim 2, wherein the charging cups further comprise at least one smartphone charging cup configured to charge a smartphone.

4. The charging station of claim 3, wherein the charging cups further comprise at least one tablet charging cup configured to charge a tablet computer.

5. The charging station of claim 2, comprising a charging circuit configured to charge each two-way radio and each power tool received by the charging cups, and wherein the charging base and the charging cups each including a portion of circuitry of the charging circuit.

6. The charging station of claim 1, wherein the at least one tool charging cup is configured for charging a power source built into the power tool.

7. The charging station of claim 1, wherein the at least one tool charging cup is configured for charging a power source of the power tool when the power source is removed from the power tool.

8. The charging station of claim 1, wherein the monitoring circuit is further configured to produce a status signal indicative of the charging status of the each device being charged and to transmit the status signal out of the charging station to inform a user.

9. A system for charging battery-powered devices including two-way radios and power tools, comprising:

a charging base configured to mechanically and electrically connect to two or more replaceable charging cups each configured to receive one or more devices of the battery-powered devices, the charging base including:

two or more charging cup receptacles each configured to receive and accommodate any one of the two or more replaceable cups;

base charging circuitry configured to provide electrical energy to each connected replaceable charging cup through a receptacle of the two or more charging cup receptacles for charging each device received by that cup; and a monitoring circuit configured to monitor a charging status for each device being charged; and a plurality of replaceable charging cups each configured to be detachably inserted into any one of the two or more charging cup receptacles, the plurality of replaceable charging cups including:

at least one radio charging cup configured to receive at least one two-way radio of the two-way radios; and at least one tool charging cup configured to receive at least one power tool of the power tools, wherein the two or more replaceable charging cups are selected from the plurality of replaceable charging cups.

10. The system of claim 9, further comprising a communication hub device configured to be communicatively coupled to the charging base, wherein the monitoring circuit is configured to transmit a status signal indicative of the charging status, and the communication hub device includes a processor configured to receive the status signal and to process the status signal for presenting the charging status.

11. The system of claim 9, wherein each cup of plurality of replaceable charging cups comprises cup charging circuitry configured to be connected to the base charging circuitry for charging each device received by that cup.

12. The system of claim 9, wherein the at least one tool charging cup is configured for charging a power source built into the power tool.

13. The system of claim 9, wherein the at least one tool charging cup is configured for charging a power source of the power tool when the power source is removed from the power tool.

14. The system of claim 9, wherein the plurality of replaceable charging cups further comprises one or more replaceable charging cups each configured to charge at least one of a smartphone or a tablet computer.

15. A method for charging battery-powered devices, comprising:

providing a charging station including a charging base configured to mechanically and electrically connect to charging cups each configured to receive one or more devices of the battery-powered devices and to charge each device received by the connected charging cups, the charging base including charging cup receptacles each configured to accommodate any one of the charging cups;

selecting the charging cups from a plurality of replaceable charging cups including at least one radio charging cup configured to receive at least one two-way radio and at least one tool charging cup configured to receive at least one power tool;

inserting each of the selected charging cups into any one of the charging cup receptacles to be mechanically and electrically connected to the charging base;

monitoring a charging status for each device being charged by the charging base; and informing a user of the charging status.

16. The method of claim 15, further comprising replacing a first charging cup inserted into a first charging cup receptacle of the charging cup receptacles with a second charging cup for charging a different type of device of the battery-powered devices, the replacement including:

removing the first charging cup from the first charging cup receptacle; and inserting the second charging cup into the first charging cup receptacle.

17. The method of claim 15, further comprising inserting a device of the battery-powered devices into a charging cup of the selected charging cups for charging.

18. The method of claim 15, further comprising:

removing a power source of a device of the battery-powered devices from the device; and inserting the removed power source into a charging cup of the selected charging cups for charging.

19. The method of claim 15, further comprising providing the plurality of replaceable charging cups with at least one of a smartphone charging cup configured to charge a smartphone or a tablet charging cup configured to charge a tablet computer.

20. The method of claim 15, comprising:

providing a communication hub device configured to be communicatively coupled to the charging station;

configuring the charging base to monitor the charging status, to produce a status signal indicative of the charging status, and to transmit the status signal to the communication hub device; and processing the status signal using a processor of the communication device for informing the user of the charging status.

* * * * *